US008451531B2

(12) United States Patent
Tokita et al.

(10) Patent No.: US 8,451,531 B2
(45) Date of Patent: May 28, 2013

(54) LIGHT AMPLIFIER

(75) Inventors: Shigeki Tokita, Uji (JP); Masaki Hashida, Uji (JP); Shuji Sakabe, Uji (JP)

(73) Assignee: Kyoto University, Kyoto-shi (JP)

( * ) Notice: Subject to any disclaimer, the term of this patent is extended or adjusted under 35 U.S.C. 154(b) by 503 days.

(21) Appl. No.: 12/863,041

(22) PCT Filed: Jan. 13, 2009

(86) PCT No.: PCT/JP2009/050302
§ 371 (c)(1),
(2), (4) Date: Jul. 15, 2010

(87) PCT Pub. No.: WO2009/090935
PCT Pub. Date: Jul. 23, 2009

(65) Prior Publication Data
US 2010/0290108 A1    Nov. 18, 2010

(30) Foreign Application Priority Data
Jan. 18, 2008    (JP) .................... 2008-009260

(51) Int. Cl.
*H01S 3/00*    (2006.01)
(52) U.S. Cl.
USPC .......................... 359/333; 359/347
(58) Field of Classification Search
USPC .................... 372/97; 359/333, 337.4, 347
See application file for complete search history.

(56) References Cited

U.S. PATENT DOCUMENTS

| 5,644,924 A | * | 7/1997 | Carr et al. ................ 62/133 |
| 5,689,363 A | * | 11/1997 | Dane et al. ............... 359/334 |
| 7,209,500 B2 | * | 4/2007 | Dane et al. ............... 372/21 |

FOREIGN PATENT DOCUMENTS

| JP | 2 16783 | 1/1990 |
| JP | 2 49483 | 2/1990 |
| JP | 2000 58949 | 2/2000 |
| JP | 2000 114620 | 4/2000 |
| JP | 2006 203117 | 8/2006 |
| JP | 2006 229079 | 8/2006 |

OTHER PUBLICATIONS

Strohkendl et al., "Highly stable amplification of femtosecond pulses", J. Opt. Soc. Am. B, vol. 11, No. 5, pp. 742-749, (May 5, 1994).
Chu et al., "A versatile 10-TW laser system with robust passive controls to achieve high stability and spatiotemporal quality", Applied Physics B79,—Lasers and Optics, pp. 193-201, (2004).
Oksenhendler et al., "Femtosecond laser pule energy self-stabilization", Applied Physics B79,—Lasers and Optics, p. 933-935, (2004).

* cited by examiner

*Primary Examiner* — Mark Hellner
(74) *Attorney, Agent, or Firm* — Oblon, Spivak, McClelland, Maier & Neustadt, L.L.P.

(57) ABSTRACT

A light amplifier includes first and second multi-pass amplifiers, an excitation light source, and a beam splitter. The second multi-pass amplifier includes a light attenuation portion provided in an optical path for a light pulse to travel to pass through a light amplification medium a plurality of times, for attenuating energy of the input light pulse. In addition, an excitation light pulse from the excitation light source is split by the beam splitter into two light pulses. These two pulses are input to the first and second multi-pass amplifiers, respectively. Thus, fluctuation in energy of the light pulse output from the light amplifier can be less than fluctuation in energy of the excitation light pulse.

6 Claims, 8 Drawing Sheets

LIGHT AMPLIFIER

TECHNICAL FIELD

The present invention relates to a light amplifier, and particularly to a light amplifier for amplifying a light pulse output from a laser oscillator.

BACKGROUND ART

Laser beams (hereinafter may be referred to as "laser") have currently been utilized in various fields. In addition, research and development of laser beams has also increasingly been conducted. For example, a method of increasing output of pulse laser or a method of stabilizing the output has been studied.

MOPA (Master Oscillation Power Amplifier) has been known as a technique for increasing output of pulse laser. MOPA refers to a method for amplifying weak pulses from a laser oscillator (hereinafter may simply be referred to as an "oscillator") using an amplifier or a system adopting such a method.

An amplifier used in MOPA generally amplifies light pulses with the use of a multi-pass amplification method or a regenerative amplification method. The multi-pass amplification method is a method for amplifying light pulses by causing light pulses to pass through a light amplification medium within an amplifier a plurality of times. Meanwhile, the regenerative amplification method is a method for amplifying light pulses by confining light pulses within an amplifier until a desired pass number is attained, for example, by controlling polarization.

In an example where a light pulse emitted from pulse laser has a pulse width not greater than several hundred nanoseconds, light amplification ends within an amplifier in a period of time not longer than a microsecond. Therefore, it is not easy to stabilize energy of light pulses output from a light amplifier.

Regarding a technique for stabilizing energy of a light pulse, for example, Non-Patent Document 1 (Strohkendl et al., "High stable amplification of femtosecond pulses," J. Opt. Soc. Am. B, Vol. 11, No. 5, pp. 742-749 (1994)) discloses a method of stabilizing output energy by optimizing pass number in a MOPA system having a single multi-pass amplifier.

For example, Non-Patent Document 2 (Chu et al., "A versatile 10-TW laser system with robust passive controls to achieve high stability and spatiotemporal quality," Appl. Phys. B79, pp. 193-201 (2004)) discloses a method of suppressing influence on an amplifier by fluctuation in output from an excitation light source by sufficiently saturating gain of the amplifier.

For example, Non-Patent Document 3 (Oksenhendler et al., "Femtosecond laser pulse energy self-stabilization," Appl. Phys. B79, pp. 933-935 (2004)) discloses a method of detecting intensity of light pulses output from a pulse laser apparatus and adjusting energy of the pulses by using a light modulator operating at an ultra high speed.

Non-Patent Document 1: Strohkendl et al., "High stable amplification of femtosecond pulses," J. Opt. Soc. Am. B, Vol. 11, No. 5, pp 742-749 (1994)

Non-Patent Document 2: Chu et al., "A versatile 10-TW laser system with robust passive controls to achieve high stability and spatiotemporal quality," Appl. Phys. B79, pp 193-201 (2004)

Non-Patent Document 3: Oksenhendler et al., "Femtosecond laser pulse energy self-stabilization," Appl. Phys. B79, pp 933-935 (2004)

DISCLOSURE OF THE INVENTION

Problems to be Solved by the Invention

FIG. 6 is a diagram illustrating a conventional amplification method adopting MOPA. Referring to FIG. 6, a light pulse amplification system 200 includes an oscillator 101, amplifiers 111 to 113, magnifying lenses 116 and 117, and excitation light sources 121 to 123.

Oscillator 101 generates seed pulses. As described above, the seed pulse is a weak light pulse (for example, light having energy of 1 (nJ)). Each of amplifiers 111 to 113 is a multi-pass amplifier. Each of amplifiers 111 to 113 contains a light amplification medium (not shown). Excitation light sources 121 to 123 are provided in correspondence with amplifiers 111 to 113 respectively, and each of them irradiates the light amplification medium contained in the corresponding amplifier with excitation light. The light amplification medium is thus excited. The light amplification medium in an excited state amplifies a light pulse input into the light amplification medium itself.

Magnifying lens 116 is provided between amplifier 111 and amplifier 112, and increases a diameter of a light pulse output from amplifier 111. Similarly, magnifying lens 117 is provided between amplifier 112 and amplifier 113, and increases a diameter of a light pulse output from amplifier 112.

It is noted that gain of amplifier 111 is set to be extremely greater than gain of amplifier 112 and gain of amplifier 113. Here, the gain is defined as (energy of light pulse after amplification)/(energy of light pulse before amplification). For example, the gain of amplifier 111, the gain of amplifier 112 and the gain of amplifier 113 are assumed as $10^6$, $10^2$ and $10^1$, respectively. Therefore, in an example where a seed pulse has energy of 1 (nJ), light pulse amplification system 200 outputs a light pulse having energy of 1 (J). Thus, light pulse amplification system 200 can generate light pulses having high energy from weak pulses, by including a plurality of amplifiers.

Here, it is considered that, since the gain of the amplifier in the first stage (amplifier 111) is great, energy of the light pulse output from amplifier 111 can be stabilized by applying the method disclosed in Non-Patent Document 1.

It is considered, however, that fluctuation in energy of the output light pulse is difficult to suppress, because the gain of the amplifier in the second stage and the amplifier in the third stage is low. Therefore, it seems difficult to suppress fluctuation in the energy of the light pulse output from light pulse amplification system 200, the reason for which will now be described.

FIG. 7 is a diagram illustrating relation between pass number and energy of output pulses. It is noted that detailed description of FIG. 7 is provided in Non-Patent Document 1 mentioned above. Therefore, overview of relation between pass number and energy of output pulses will be described hereinafter.

Referring to FIG. 7, a curve represents relation of an output ($J_{out}/J_{sat}$) with pass number. $J_{out}$ represents an output fluence and $J_{sat}$ represents a saturation fluence of a light amplification medium.

In FIG. 7, a numeric value (for example, $10^{-3}$, $10^{-5}$ or the like) is provided to each unit, with five curves being defined as one unit. This numeric value represents a ratio ($J_{in}/J_{sat}$) of the saturation fluence to an input fluence ($J_{in}$) of the amplifier. A greater numeric value indicates higher energy of a pulse input to the amplifier.

Meanwhile, five curves corresponding to each unit represent fluctuation in excitation energy. Superimposition of the five curves on one another indicates that energy of the output pulses is stable regardless of fluctuation in excitation energy. For example, when ($J_{in}/J_{sat}$) is $10^{-9}$, energy of the output pulses can be stabilized by setting the pass number to approximately 40 or greater.

On the other hand, energy of the light pulse input to each of amplifiers 112 and 113 is relatively high. In addition, since the gain required in each of amplifiers 112 and 113 is low, the pass number of each amplifier 112, 113 is small (for example, 4 to 5). Based on the relation between the pass number and the output from the light amplifier shown in FIG. 7, it can be seen that energy of the output pulse fluctuates in accordance with fluctuation in excitation energy when energy of the input pulse is high and the pass number is small. Therefore, as energy of the excitation light pulse input to each of amplifiers 112 and 113 fluctuates, energy of the light pulse output from each amplifier also fluctuates.

For the reasons above, according to the method shown in Non-Patent Document 1, it is difficult to stabilize energy of the light pulse output from the light pulse amplification system including amplifiers in multiple stages.

In addition, according to the method shown in Non-Patent Document 2, it is difficult to make fluctuation in output from the amplifier less than fluctuation in excitation energy.

Moreover, in applying the method shown in Non-Patent Document 3, life of a photoconduction switch is disadvantageously short. Further, conditions for a wavelength and energy of a light pulse for applying this method are restricted.

The present invention solves the above-described problems, and an object thereof is to provide a light amplifier capable of stabilizing output.

Means for Solving the Problems

In summary, the present invention is directed to a light amplifier including a first amplifier and a second amplifier. The first amplifier includes a first light amplification medium excited by a first light pulse, for amplifying an input laser light pulse in an excited state and a first optical system for forming a first optical path for the laser light pulse to pass through the first light amplification medium a plurality of times. The second amplifier includes a second light amplification medium excited by a second light pulse, for amplifying input amplified light in an excited state, a second optical system for forming a second optical path for the amplified light to pass through the second light amplification medium a plurality of times, and a light attenuation portion provided in the second optical path, for attenuating energy of the amplified light incident on the light attenuation portion itself. The light amplifier further includes an excitation light source for generating an excitation light pulse for exciting the first and second light amplification media, and a first pulse splitting portion for splitting the excitation light pulse from the excitation light source into the first and second light pulses.

Preferably, the number of times of passage of the laser light pulse traveling along the first optical path through the first light amplification medium is equal to the number of times of passage of the amplified light traveling along the second optical path through the second light amplification medium.

Preferably, the light amplifier further includes an intensity adjustment portion. The intensity adjustment portion adjusts intensity of at least one pulse of the first and second light pulses such that a ratio between energy of the first light pulse input to the first light amplification medium and energy of the second light pulse input to the second light amplification medium attains to a prescribed value.

More preferably, the number of times of passage of the laser light pulse traveling along the first optical path through the first light amplification medium is equal to the number of times of passage of the amplified light traveling along the second optical path through the second light amplification medium.

Further preferably, the intensity adjustment portion adjusts intensity of the at least one pulse such that an average value within a prescribed period of time of intensity of the amplified light output from the first amplifier and an average value within the prescribed period of time of intensity of output light output from the second amplifier are constant.

Preferably, the light amplifier further includes a second pulse splitting portion and a third amplifier. The second pulse splitting portion extracts a third light pulse from the second light pulse. The third amplifier is identical in configuration to the second amplifier. The third amplifier amplifies output light from the second amplifier as it receives the third light pulse and the output light.

The maximum number of amplifiers included in the light amplifier according to the present invention is not limited to three, and the number of amplifiers may be set to three or more. Namely, the light amplifier according to the present invention may include, for example, a fourth amplifier or fourth and fifth amplifiers in addition to the first to third amplifiers above.

Effects of the Invention

According to the present invention, in a light amplifier including a plurality of multi-pass amplifiers, energy of a light pulse output from the light amplifier can be stabilized.

Figure 1:
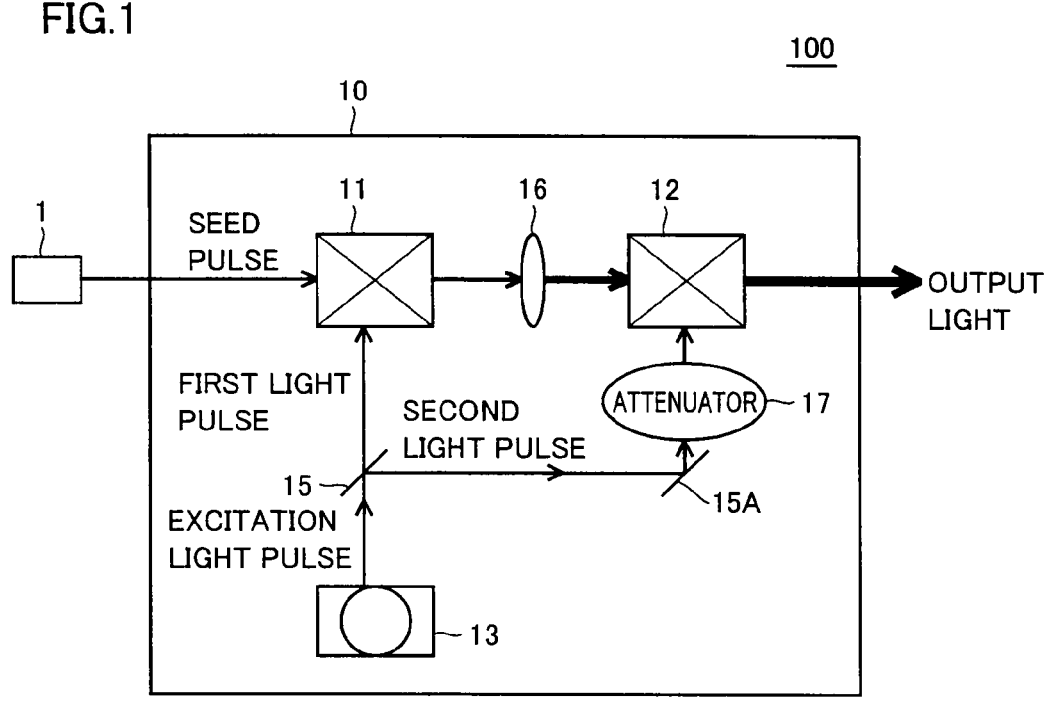
FIG. 1 is a schematic configuration diagram of a light pulse amplification system 100 including a light amplifier 10 according to a first embodiment.

DESCRIPTION OF THE REFERENCE SIGNS 1, 101 oscillator; 2 pulse expander; 5 optical isolator; 6A, 6B convex lens; 7A, 7B light amplification medium; 8A to 8D concave mirror; 9A to 9D, 93 polarizer; 10 light amplifier; 11, 12, 12A multi-pass amplifier; 13, 121 to 123 excitation light source; 14, 15A, 15C, 23 to 25, 31 to 39, 41, 42, 51, 53 to 55, 61 to 68, 82 reflecting mirror; 15, 15B, 22, 52 beam splitter; 16, 16A, 116, 117 magnifying lens; 17, 17A, 18 attenuator; 20A, 20B, 95 Pockels cell; 21, 91 half-wave plate; 45 convex mirror; 71 to 74 quartz plate; 81, 83 light-receiving element; 84 control device; 92 motor; 96 driver; 100, 100A, 200 light pulse amplification system; 111 to 113 amplifier; and P1, P2 optical path.

BEST MODES FOR CARRYING OUT THE INVENTION

An embodiment of the present invention will be described hereinafter in detail with reference to the drawings. In the drawings, the same or corresponding elements have the same reference characters allotted and description thereof will not be repeated.

First Embodiment

FIG. 1 is a schematic configuration diagram of a light pulse amplification system 100 including a light amplifier 10 according to a first embodiment.

Referring to FIG. 1, light pulse amplification system 100 includes an oscillator 1 for generating seed pulses (laser light pulses) and light amplifier 10 for amplifying the seed pulses from oscillator 1 for output.

Light amplifier 10 includes multi-pass amplifiers 11 and 12, an excitation light source 13, a beam splitter 15, a magnifying lens 16, and an attenuator 17.

The seed pulse from oscillator 1 is amplified by multi-pass amplifier 11. A light pulse (amplified light) output from multi-pass amplifier 11 passes through magnifying lens 16 and enters multi-pass amplifier 12. Multi-pass amplifier 12 amplifies the input light pulse (amplified light) for output. Magnifying lens 16 is provided between multi-pass amplifier 11 and multi-pass amplifier 12 and increases a diameter of the light pulse from multi-pass amplifier 11.

Thus, light pulse amplification system 100 can generate light pulses having high energy from weak pulses by including a plurality of amplifiers. Gain of multi-pass amplifier 11 and gain of multi-pass amplifier 12 are appropriately determined in accordance with gain required in light amplifier 10.

Each of multi-pass amplifiers 11 and 12 contains a light amplification medium (not shown). The light amplification medium may be any of a solid, a liquid and a gas. For example, titanium sapphire, Nd:YAG (Yttrium Aluminum Garnet) or the like can be used as a solid light amplification medium.

Excitation light source 13 emits a light pulse for exciting the light amplification medium. Beam splitter 15 splits an excitation light pulse from excitation light source 13 into first and second light pulses. A ratio between energy of the first light pulse and energy of the second light pulse is determined, for example, based on experimental results. It is noted that this ratio is determined such that the energy of the second excitation light pulse is greater than energy of the first excitation light pulse. This is done in order to make energy of the light pulse output from multi-pass amplifier 12 greater than energy of the light pulse output from multi-pass amplifier 11.

The first light pulse is input to multi-pass amplifier 11 to excite the light amplification medium contained in multi-pass amplifier 11. As the second light pulse passes through attenuator 17, intensity (energy) thereof is weakened. The second light pulse that has passed through attenuator 17 is input to multi-pass amplifier 12 to excite the light amplification medium contained in multi-pass amplifier 12.

In each of multi-pass amplifiers 11 and 12, a laser light pulse passes through the light amplification medium in the excited state a plurality of times, so that the light pulse is amplified. This amplification method may be any of the multi-pass amplification method and the regenerative amplification method. Therefore, these methods are herein collectively referred to as a "multi-pass amplification method."

In general, it is difficult to manufacture beam splitter 15 such that a ratio between energy of a first light pulse and energy of a second light pulse attains to a value designed in advance. By attenuating the second light pulse through attenuator 17, the ratio between energies of two light pulses input to multi-pass amplifier 11 and multi-pass amplifier 12 respectively can be maintained at a prescribed ratio. It is noted that attenuator 17 preferably can adjust (attenuate) energy of an input light pulse continuously.

In addition to or instead of attenuator 17, an attenuator capable of adjusting (attenuating) energy of a first light pulse may be provided.

In the present embodiment, as an excitation light pulse from excitation light source 13 is split by beam splitter 15 into first and second light pulses, fluctuation in energy of the excitation light pulse is reflected on fluctuation in energy of the first and second light pulses. Namely, when the energy of the excitation light pulse increases, the energy of the first light pulse and the energy of the second light pulse both increase. On the other hand, when the energy of the excitation light pulse decreases, the energy of the first light pulse and the energy of the second light pulse both decrease.

In addition, a light attenuation portion provided in an optical path through which a laser light pulse passes, for attenuating energy of the laser light pulse incident on the light attenuation portion itself, is provided in multi-pass amplifier 12. The energy of the light pulse output from light amplifier 10 can thus be stabilized.

It is noted that the second light pulse is guided to attenuator 17 by a reflecting mirror 15A in FIG. 1. The second light pulse, however, may directly be input to attenuator 17. In such a case, reflecting mirror 15A is not necessary.

Light amplifier 10 according to the present embodiment will now be described in further detail. Amplification of a light pulse by each of multi-pass amplifiers 11 and 12 can be explained by using the Franz-Nodvik Equation. The Franz-Nodvik Equation is expressed as the following equation (1):

$$J_{out}^{(p)} = J_{sat} \ln(1 + \alpha G_0^{(p)} \{\exp[J_{in}^{(p)}/J_{sat}] - 1\}) \quad (1)$$

where p represents pass number, $J_{in}$ represents an input fluence, $J_{out}$ represents an output fluence, and $J_{sat}$ represents a saturation fluence. $G_0^{(p)}$ represents small signal gain, which is shown in the following equation (2):

$$G_0^{(p)} = \exp[J_{sto}^{(p)}/j_{sat}] \quad (2)$$

where $J_{sto}^{(p)}$ represents a fluence that is stored in the light amplification medium and can be extracted through an amplification effect.

In the present embodiment, it is assumed in this Franz-Nodvik Equation that relation of $J_{in}(p+1) = J_{out}(p) \times T$ is satisfied, where T represents transmittance (0<T<1) Namely, in the present embodiment, a laser light pulse that has passed through the light amplification medium is attenuated and the attenuated light is again input to the light amplification medium.

Figure 2:
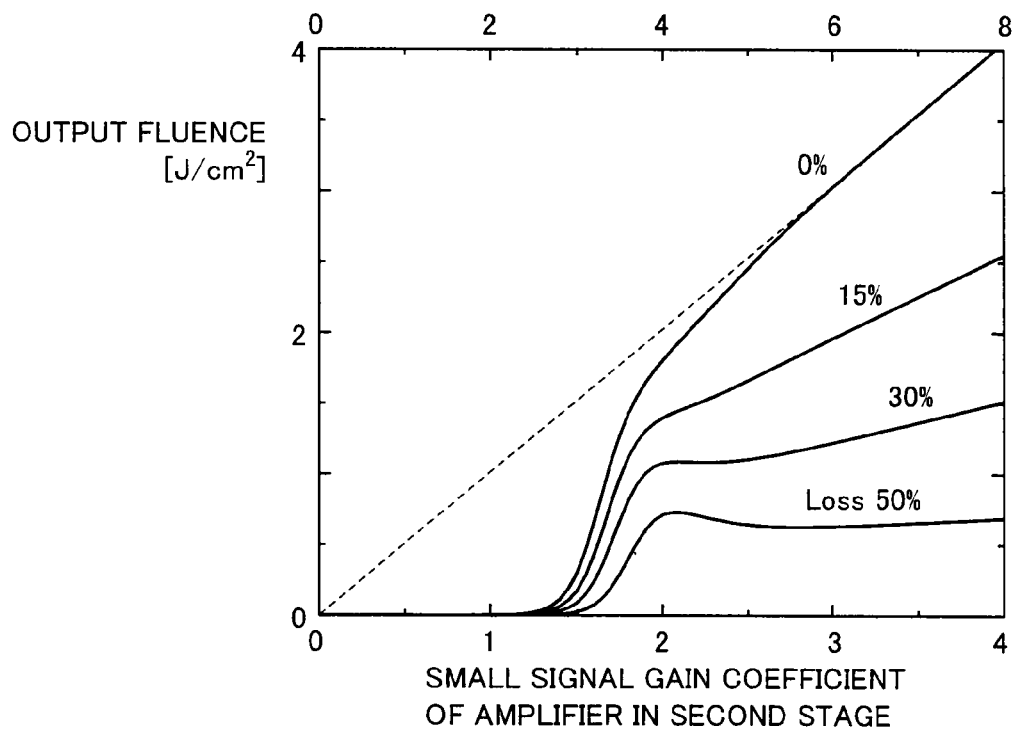
FIG. 2 is a diagram showing results of numerical analysis using the Franz-Nodvik Equation.

FIG. 2 is a diagram showing results of numerical analysis using the Franz-Nodvik Equation. It is noted that FIG. 2 is a diagram showing the results of numerical analysis in an example where a light pulse is amplified by a light amplifier in which a titanium sapphire multi-pass amplifier (with its pass number being set to 4) is employed as a multi-pass amplifier in the first stage and a multi-pass amplifier in the second stage.

Referring to FIG. 2, "Loss" in this figure indicates loss for each pass in the multi-pass amplifier in the second stage. It is noted that loss for each pass is zero in the multi-pass amplifier in the first stage.

Calculation conditions for obtaining the results shown in FIG. 2 will further be described. An excitation fluence of the multi-pass amplifier in the first stage was set to twice that of the multi-pass amplifier in the second stage. A scale on the upper abscissa in the graph in FIG. 2 represents the excitation fluence of the amplifier in the first stage, while a lower scale in the graph represents the excitation fluence of the amplifier in the second stage.

In addition, an example where a diameter of a beam (a light pulse) is increased to four times as large as before (the fluence is decreased to $\frac{1}{16}$ of the original value) after amplification of the light pulse by the multi-pass amplifier in the first stage and the beam increased in diameter is incident on the multi-pass amplifier in the second stage is assumed. A seed pulse incident on the multi-pass amplifier in the first stage has a fluence of $10^{-7}$ [J/cm$^2$].

As shown in FIG. 2, the output fluence from the multi-pass amplifier in the second stage varies in accordance with a small signal gain coefficient. Initially, an example where energy loss of a laser light pulse for each pass is not caused (loss is 0%) in the multi-pass amplifier in the second stage will be described. When a small signal gain coefficient is not lower than approximately 1.5, a curve representing relation between the small signal gain coefficient and the output fluence is superimposed on a straight line (in the drawing, shown with a dashed line) passing through the origin. This means that, in saturation amplification, stability of energy of a pulse output from the multi-pass amplifier is dependent on stability of the small signal gain coefficient. Namely, when loss is 0%, it is difficult to achieve fluctuation in energy of a pulse output from the multi-pass amplifier in the second stage less than fluctuation in excitation energy.

On the other hand, by varying the loss to 5%, 10%, 15%, and so on, energy of a pulse output from the multi-pass amplifier can be stabilized, regardless of the small signal gain coefficient. For example, when the loss is 30%, a stable area where the output fluence does not vary appears around where the small signal gain coefficient is approximately 2.2. By causing the multi-pass amplifier in the second stage to operate with the small signal gain coefficient in this area being set, fluctuation in energy of the pulse output from the multi-pass amplifier in the second stage can be suppressed even when energy of the excitation light pulse slightly fluctuate. In other words, output from the amplifier can be stabilized against fluctuation in output from an excitation light source.

Figure 3:
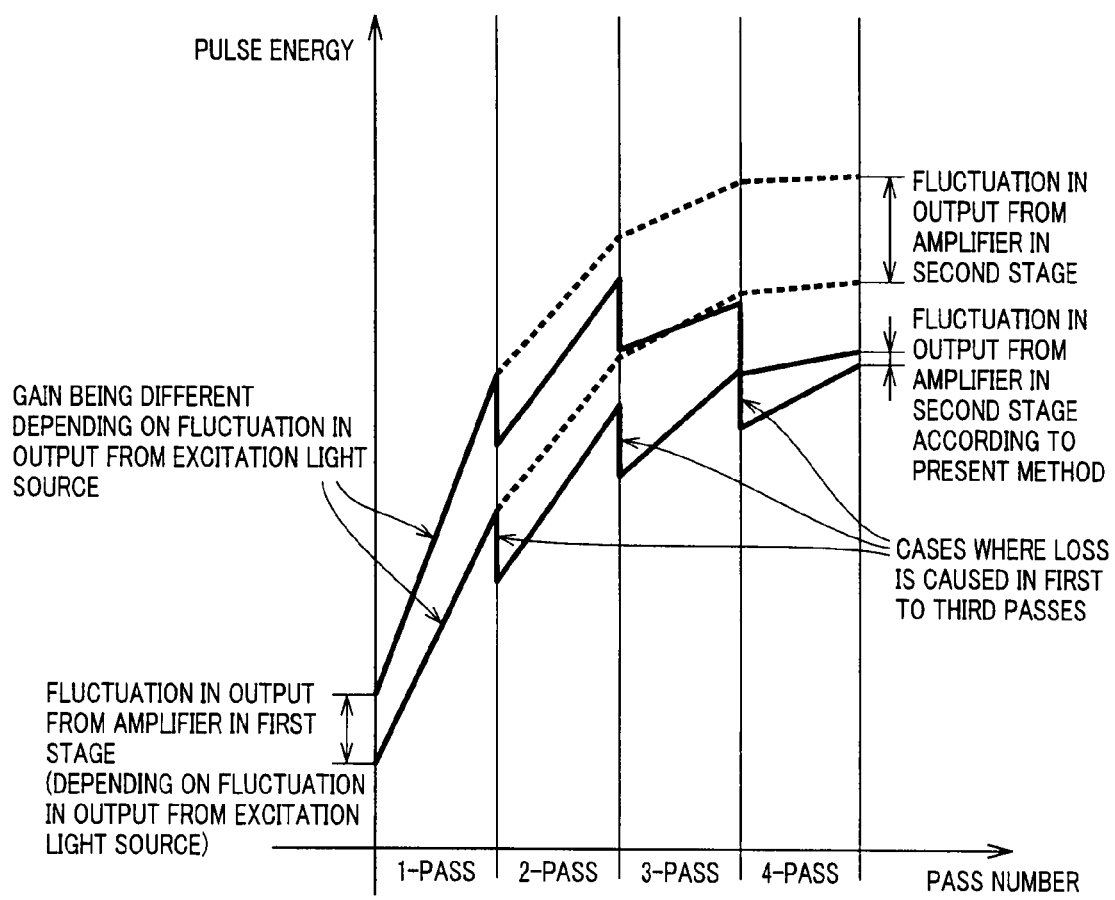
FIG. 3 is a conceptual diagram for illustrating the results of numerical analysis shown in FIG. 2.

FIG. 3 is a conceptual diagram for illustrating the results of numerical analysis shown in FIG. 2. Referring to FIGS. 3 and 1, initially, energy of an excitation light pulse (a first light pulse) input to the amplifier in the first stage (multi-pass amplifier 11) fluctuates due to fluctuation in output from excitation light source 13. Therefore, output from multi-pass amplifier 11 fluctuates.

When loss for each pass is not caused in multi-pass amplifier 12, output from multi-pass amplifier 12 fluctuates as shown with a dashed line. Energy of an excitation light pulse (a second light pulse) input to the amplifier in the second stage (multi-pass amplifier 12) fluctuates, similarly to the energy of the first light pulse. Namely, as the energy of the first light pulse increases, energy of the second light pulse also increases and hence energy of the pulse output from multi-pass amplifier 12 becomes greater. On the other hand, as the energy of the first light pulse lowers, energy of the second light pulse also lowers and hence energy of the pulse output from multi-pass amplifier 12 becomes lower. Gain in each pass thus fluctuates.

It is noted that the slope of the straight line in each pass (the number of times of passage of a light pulse through a light amplification medium) represents gain of the light pulse. As the pass number is greater, gain becomes smaller. This is because, as the light pulse passes through the light amplification medium in the excited state, a part of energy stored in the light amplification medium is extracted to amplify the light pulse, whereas energy stored in the light amplification medium gradually decreases.

An example where loss for each pass is caused in multi-pass amplifier 12 will now be described. A solid line in FIG. 3 represents variation in energy of a pulse in an example where loss for each pass is caused in multi-pass amplifier 12.

When output from multi-pass amplifier 11 attains to a maximum value in its fluctuation range and when the pass number is 1 and 2, a large amount of energy is extracted from the light amplification medium. When the pass number is 3 and 4, energy that remains in the light amplification medium is low and hence gain of the light amplification medium lowers. On the other hand, each time a light pulse passes through the light amplification medium, the light pulse is amplified, however, loss in energy of the light pulse is also caused. Consequently, the light pulse is amplified when the pass number is 1 and 2, whereas the light pulse is attenuated when the pass number is 3 and 4.

Meanwhile, when output from multi-pass amplifier 11 attains to a minimum value in its fluctuation range, energy of the light pulse input to the light amplification medium when the pass number is 2 is lower than energy of the light pulse when loss is caused in each of first pass to third pass. Therefore, energy extracted from the light amplification medium is also lower than the energy extracted from the light amplification medium when there is no loss for each pass. Thus, even when the pass number is 3 and 4, the light pulse is amplified. Consequently, as compared with fluctuation in the output from multi-pass amplifier 11, fluctuation in the output from multi-pass amplifier 12 can be less.

It is noted that the number of passes by which loss of energy of a light pulse is caused is determined based on a rate of loss of energy of the light pulse per one pass, fluctuation in excitation energy, and the like. Therefore, it is not necessary to cause loss in every pass.

Figure 4:
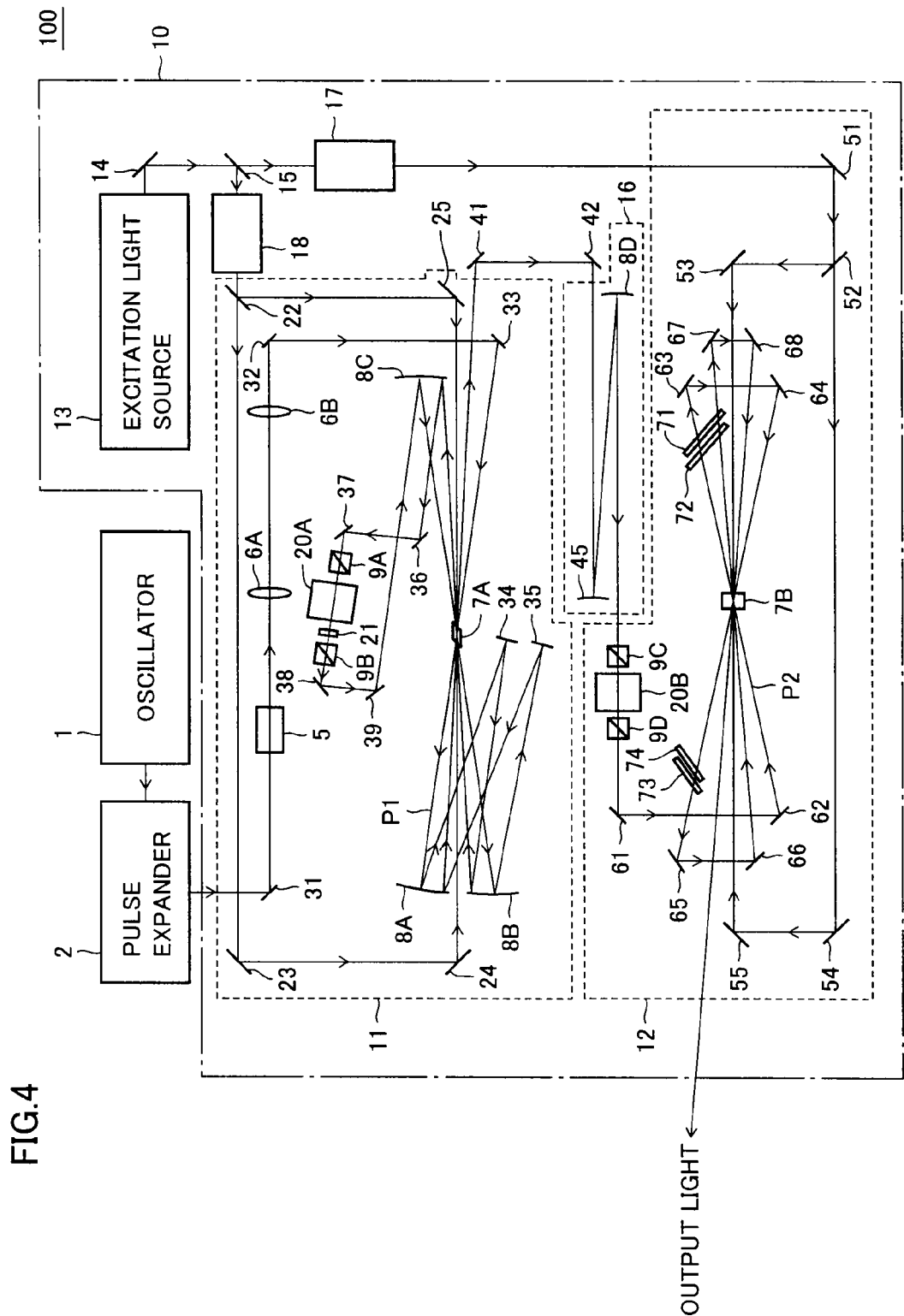
FIG. 4 is a diagram showing a specific example of a configuration of light pulse amplification system 100 shown in FIG. 1.

FIG. 4 is a diagram showing a specific example of a configuration of light pulse amplification system 100 shown in FIG. 1. It is noted that an optical path of a light pulse is shown with an arrow in FIG. 4.

Referring to FIG. 4, oscillator 1 generates, for example, a light pulse having a pulse width of a femtosecond level. As a pulse expander 2 receives the pulse from oscillator 1, pulse expander 2 increases a width of the pulse. The pulse from pulse expander 2 is input to light amplifier 10 as a seed pulse.

Light amplifier 10 includes multi-pass amplifiers 11 and 12, excitation light source 13, a reflecting mirror 14, beam splitter 15, magnifying lens 16, attenuators 17 and 18, and reflecting mirrors 41 and 42.

Multi-pass amplifier 11 includes an optical isolator 5, convex lenses 6A and 6B, a light amplification medium 7A, concave mirrors 8A, 8B and 8C, polarizers 9A and 9B, a Pockels cell 20A, a half-wave plate 21, a beam splitter 22, and reflecting mirrors 23 to 25 and 31 to 39.

Light amplification medium 7A is made of titanium sapphire crystals. Excitation light source 13 generates excitation light pulses.

Excitation light source 13 is implemented, for example, by a Q switch Nd:YAG laser and a non-linear element for generating harmonics of light emitted from the Q switch Nd:YAG laser. An excitation light pulse from excitation light source 13 is reflected by reflecting mirror 14 and split into two light pulses by beam splitter 15. One of the two light pulses passes through attenuator 18 and split into two light pulses by beam splitter 22. One of the two light pulses output from beam splitter 22 is input to one end surface of the titanium sapphire crystals (light amplification medium 7A) by means of reflecting mirrors 23 and 24. The other of the two light pulses output from beam splitter 15 is input to the other surface of the titanium sapphire crystals (light amplification medium 7A) by means of reflecting mirror 25. Light amplification medium 7A is excited by the two light pulses input to light amplification medium 7A.

FIG. 4 shows an optical path of a light pulse in multi-pass amplifier 11 as an optical path P1. The seed pulse from pulse expander 2 travels through this optical path P1.

The seed pulse from pulse expander 2 is reflected by reflecting mirror 31 and passes through optical isolator 5 and convex lenses 6A and 6B. Optical isolator 5 serves to allow passage of the light pulse only from reflecting mirror 31 toward reflecting mirror 32. The light pulse that has passed through convex lens 6B is input to light amplification medium 7A by means of reflecting mirrors 32 and 33 and passes through light amplification medium 7A (1-pass).

The light that has passed through light amplification medium 7A reaches concave mirror 8A. The light pulse that has reached concave mirror 8A is reflected by each of reflecting mirror 34 and concave mirror 8B and passes through light amplification medium 7A (2-pass).

The light that has passed through light amplification medium 7A reaches concave mirror 8C. The light pulse that has reached concave mirror 8C is reflected by each of concave mirror 8C, reflecting mirror 36 and reflecting mirror 37 and input to polarizer 9A. The light pulse input to polarizer 9A passes through polarizer 9A, Pockels cell 20A, half-wave plate 21, and polarizer 9B. Pockels cell 20A electrically switches a direction of polarization of the light pulse. Polarizer 9A, Pockels cell 20A, half-wave plate 21, and polarizer 9B serve to thin out the seed pulses.

The light pulse that has passed through polarizer 9B is reflected by each of reflecting mirrors 38 and 39 and reaches concave mirror 8C. The light pulse is reflected by concave mirror 8C and passes through light amplification medium 7A (3-pass).

The light pulse that has passed through light amplification medium 7A is reflected by each of concave mirror 8B, reflecting mirror 35 and concave mirror 8A and passes through light amplification medium 7A (4-pass).

The light that has passed through light amplification medium 7A is guided to magnifying lens 16 by reflecting mirrors 41 and 42.

Magnifying lens 16 includes a convex mirror 45 and a concave mirror 8D. The light pulse reflected by reflecting mirror 41 is reflected by convex mirror 45 and concave mirror 8D so that its diameter is increased. The light pulse reflected by concave mirror 8D is input to multi-pass amplifier 12.

Multi-pass amplifier 12 includes a light amplification medium 7B, polarizers 9C and 9D, a Pockels cell 20B, a beam splitter 52, reflecting mirrors 51, 53 to 55 and 61 to 68, and quartz plates 71 to 74.

FIG. 4 shows an optical path of a light pulse in multi-pass amplifier 12 as an optical path P2. The light pulse from concave mirror 8D travels through this optical path P2.

Light amplification medium 7B is made of titanium sapphire crystals, similarly to light amplification medium 7A. As described above, one of the two light pulses from beam splitter 15 passes through attenuator 18. In contrast, the other of the two light pulses passes through attenuator 17. The light pulse that has passed through attenuator 17 is reflected by reflecting mirror 51 and further split into two light pulses by beam splitter 52. One of the two light pulses output from beam splitter 52 is input to one end surface of the titanium sapphire crystals (light amplification medium 7B) by means of reflecting mirrors 54 and 55. The other of the two light pulses output from beam splitter 52 is input to the other end surface of the titanium sapphire crystals (light amplification medium 7B) by means of reflecting mirror 53. Light amplification medium 7B is excited by the two light pulses input to light amplification medium 7B.

The light pulse from concave mirror 8D (amplified light) is input to polarizer 9C. The light pulse input to polarizer 9C passes through polarizer 9C, Pockets cell 20B and polarizer 9D. The light pulse output from polarizer 9D is reflected by each of reflecting mirrors 61 and 62 and input to light amplification medium 7B and passes therethrough (1-pass).

The light pulse that has passed through light amplification medium 7B passes through quartz plates 72 and 71. Quartz plates 72 and 71 are set such that a surface of each of them is oblique to optical path P2 of the light pulse. Thus, the light pulse that has passed through quartz plates 72 and 71 is attenuated. The light pulse that has passed through quartz plate 71 is reflected by each of reflecting mirrors 63 and 64 and input to light amplification medium 7B and passes therethrough (2-pass).

The light pulse that has passed through light amplification medium 7B passes through quartz plates 74 and 73. Quartz plates 74 and 73 are set such that a surface of each of them is oblique to optical path P2 of the light pulse. Thus, the light pulse that passes through quartz plates 74 and 73 is attenuated. The light pulse that has passed through quartz plate 73 is reflected by each of reflecting mirrors 65 and 66 and input to light amplification medium 7B and passes therethrough (3-pass).

The light pulse that has passed through light amplification medium 7B is attenuated as a result of passage through quartz plates 72 and 71. The light pulse that has passed through quartz plate 71 is reflected by each of reflecting mirrors 67 and 68 and input to light amplification medium 7B and passes therethrough (4-pass). The light that has passed through light amplification medium 7B is output from light amplifier 10.

Fluctuation in the energy of the light pulse output from light pulse amplification system 100 shown in FIG. 4 (output light) was measured. Conditions for measurement are shown as follows. A titanium sapphire mode-locked oscillator was employed as oscillator 1. A pulse output from the titanium sapphire mode-locked oscillator had a central wavelength of approximately 800 (nm), a pulse width (a temporal width) of approximately 100 (fs), and a repetition frequency of 80

(MHz). In addition, this pulse had energy of 10 (nJ). The pulse output from pulse expander 2 had a pulse width of approximately 400 (ps).

A Q switch Nd:YAG laser oscillator and a non-linear element for generating second harmonics of a light pulse received from the Nd:YAG laser oscillator were employed as excitation light source 13. The excitation light pulse emitted from excitation light source 13 had a wavelength of approximately 532 (nm). The light pulse from excitation light source 13 was split by beam splitter 15 into a light pulse having energy of approximately 90 (mJ) and a light pulse having energy of approximately 450 (mJ). A 1:1 beam splitter was employed as beam splitters 22 and 52.

In addition, the pulses were thinned out by Pockels cell 20A so that the repetition frequency of the pulse was set to 10 (Hz). The light pulse output from multi-pass amplifier 11 had energy of 7 (mJ).

In multi-pass amplifier 12, the rate of loss of energy by quartz plates 72 and 71 and the rate of loss of energy by quartz plates 74 and 73 were 30%.

Results of measurement of fluctuation in the energy of the output pulse when light pulse amplification system 100 was operated in accordance with the conditions described above are shown in FIG. 5.

Figure 5:
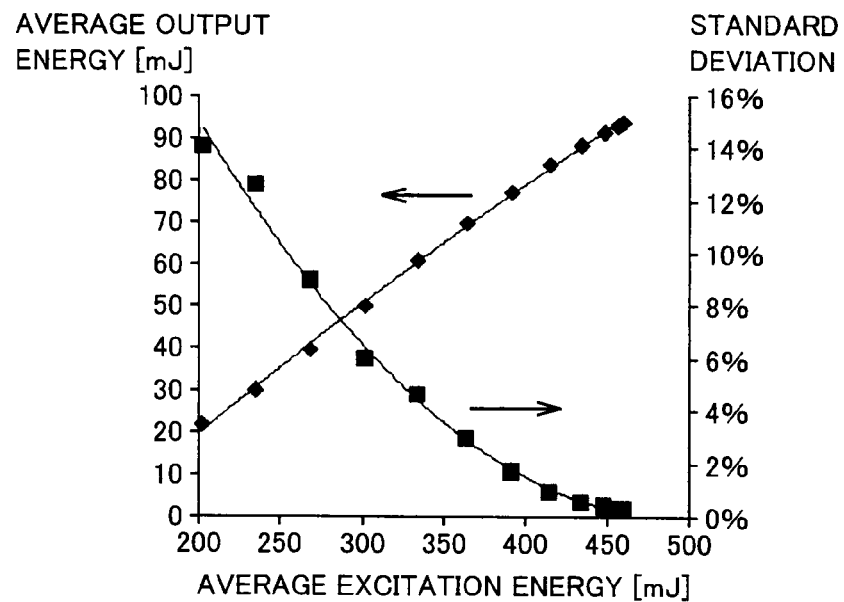
FIG. 5 is a diagram showing results of measurement of average output energy and standard deviation of the output energy when energy of an excitation pulse input to a multi-pass amplifier 12 was varied in light pulse amplification system 100 shown in FIG. 4.
Figure 6:
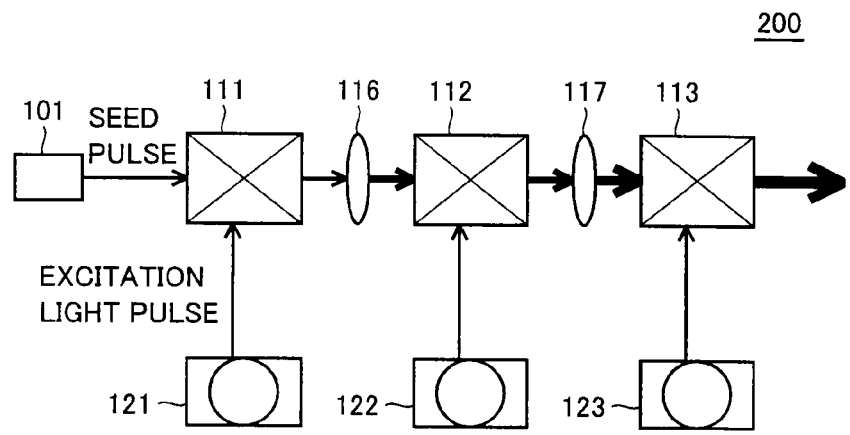
FIG. 6 is a diagram illustrating a conventional amplification method adopting MOPA.
Figure 7:
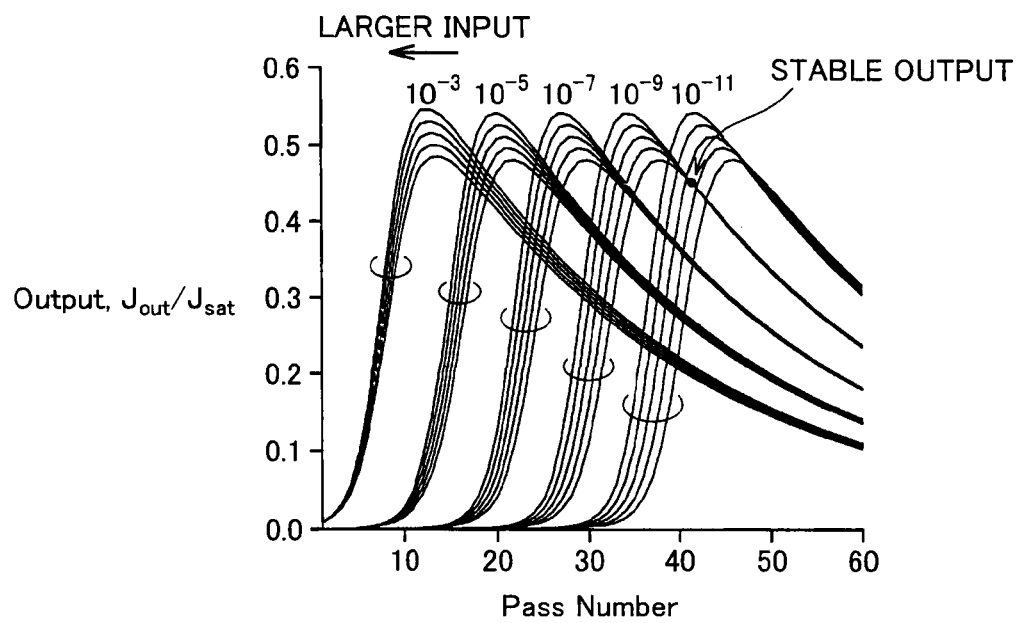
FIG. 7 is a diagram illustrating relation between pass number and energy of output pulses.

FIG. 5 is a diagram showing results of measurement of average output energy and standard deviation of the output energy when energy of an excitation light pulse input to multi-pass amplifier 12 was varied. It is noted that the number of pulses for calculating the average output energy was set to 500.

Referring to FIG. 5, as the energy of the output pulse increases with the increase in excitation energy, a standard deviation lowers. When the excitation light pulse has energy of approximately 450 mJ, an average value of the energy of the output pulse was approximately 93 mJ and the standard deviation was 0.3% of that average value. The standard deviation of the energy of the excitation light pulse was approximately 1.7%. Namely, the standard deviation of the energy of the output pulse was approximately 1/5 of the standard deviation of the energy of the excitation light pulse input to multi-pass amplifier 12.

It is noted that the energy of the excitation light pulse from excitation light source 13 is split at a prescribed ratio by beam splitter 15. Similarly, attenuator 17 attenuates the input light pulse at a prescribed attenuation factor. Therefore, the standard deviation of the energy of the excitation light pulse from excitation light source 13 is considered to be comparable to the standard deviation of the energy of the excitation light pulse input to multi-pass amplifier 12. Therefore, the results in FIG. 5 indicate that fluctuation in the energy of the light pulse output from light amplifier 10 can be less than fluctuation in the energy of the excitation light pulse emitted from excitation light source 13.

Thus, according to the present embodiment, light amplifier 10 includes multi-pass amplifiers 11 and 12, excitation light source 13 and beam splitter 15. Multi-pass amplifier 12 includes therein a light attenuation portion provided in an optical path for a light pulse to travel to pass through a light amplification medium a plurality of times, for attenuating energy of the input light pulse. In addition, the excitation light pulse from excitation light source 13 is split into two light pulses by beam splitter 15. These two pulses are input to multi-pass amplifiers 11 and 12, respectively. Thus, fluctuation in the energy of the light pulse output from light amplifier 10 can be less than fluctuation in the energy of the excitation light pulse.

In addition, in the present embodiment, the pass number in multi-pass amplifier 11 is equal to the pass number in multi-pass amplifier 12. Therefore, multi-pass amplifiers 11 and 12 can have substantially the same configuration. The configuration of light amplifier 10 can thus be simplified.

Second Embodiment

Figure 8:
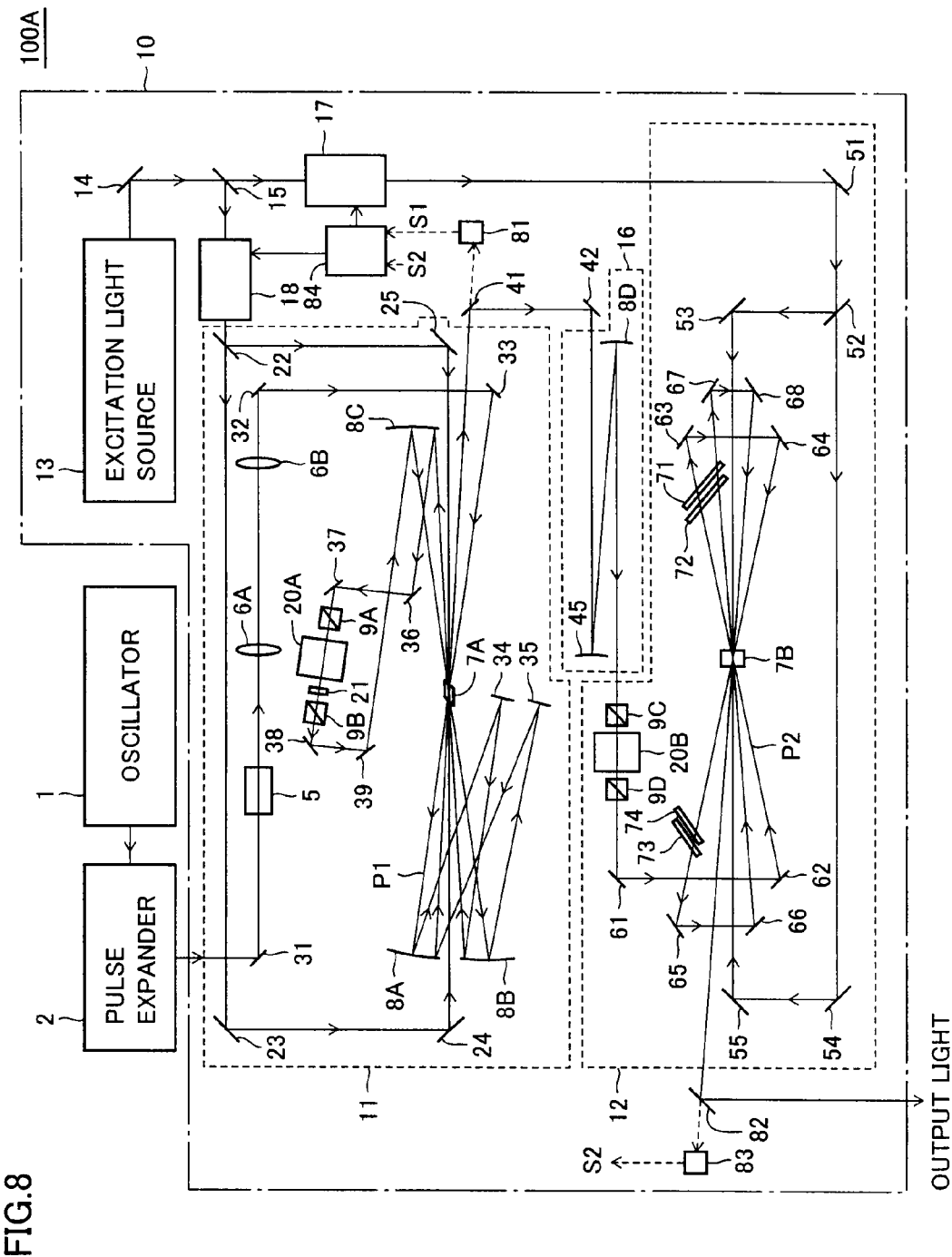
FIG. 8 is a diagram showing a specific example of a light pulse amplification system according to a second embodiment.

FIG. 8 is a diagram showing a specific example of a light pulse amplification system according to a second embodiment. Referring to FIGS. 8 and 4, a light pulse amplification system 100A is different from light pulse amplification system 100 in further including light-receiving elements 81 and 83, a reflecting mirror 82 and a control device 84. Since light pulse amplification system 100A is otherwise configured similarly to corresponding portions of light pulse amplification system 100, further description will not be repeated.

Light-receiving elements 81 and 83 are each implemented, for example, by a photodiode. Light-receiving element 81 receives light that has passed through reflecting mirror 41, and outputs a signal S1 indicating intensity of the received light. Reflecting mirror 82 reflects output light from multi-pass amplifier 12. It is noted that a part of output light from multi-pass amplifier 12 passes through reflecting mirror 82. Light-receiving element 83 receives light that has passed through reflecting mirror 82 and outputs a signal S2 indicating intensity of the received light.

The intensity of light received by light-receiving element 81 varies in accordance with intensity of light output from multi-pass amplifier 11. Therefore, intensity of signal S1 varies in accordance with the intensity of light output from multi-pass amplifier 11. Similarly, intensity of light reception by light-receiving element 83 varies in accordance with intensity of light output from multi-pass amplifier 12. Therefore, intensity of signal S2 varies in accordance with intensity of light output from multi-pass amplifier 12.

Control device 84 controls an attenuation factor of attenuator 18 by controlling attenuator 18 in accordance with signal S1. Similarly, control device 84 controls an attenuation factor of attenuator 17 by controlling attenuator 17 in accordance with signal S2.

Figure 9:
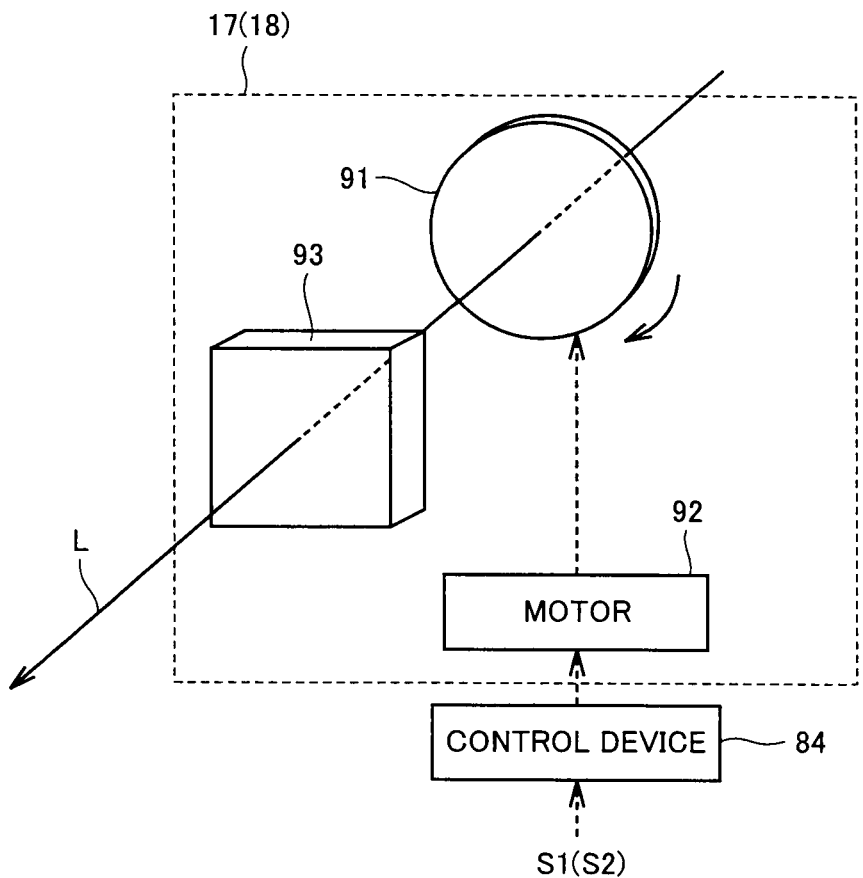
FIG. 9 is a first diagram showing an example of a specific configuration of attenuators 17 and 18.

FIG. 9 is a first diagram showing an example of a specific configuration of attenuators 17 and 18. Referring to FIG. 9, attenuator 17 includes a half-wave plate 91, a motor 92 causing half-wave plate 91 to rotate, and a polarizer 93. Control device 84 controls an angle of rotation of half-wave plate 91 by controlling motor 92 in accordance with signal S2. The attenuation factor of attenuator 17 is thus controlled. It is noted that attenuator 18 is similar in configuration to attenuator 17. In controlling the attenuation factor of attenuator 18, control device 84 controls an angle of rotation of half-wave plate 91 by controlling motor 92 in accordance with signal S1.

By combining half-wave plate 91 and polarizer 93 with each other and by varying an angle of rotation of half-wave plate 91, a polarization state of attenuators 17 and 18 can be varied. As the attenuation factor of each of attenuators 17 and 18 is thus controllable, intensity of light (indicated with a light beam L in the drawing) that has passed through attenuators 17 and 18 is adjustable.

Figure 10:
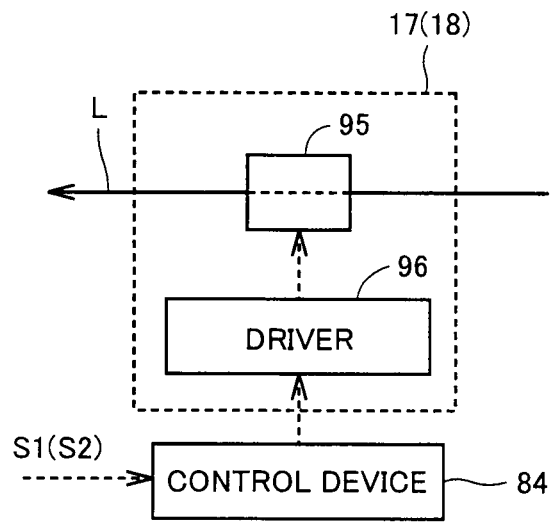
FIG. 10 is a second diagram showing an example of a specific configuration of attenuators 17 and 18.

FIG. 10 is a second diagram showing an example of a specific configuration of attenuators 17 and 18. Referring to FIG. 10, attenuator 17 includes a Pockels cell 95 and a driver 96 for applying a voltage to Pockels cell 95.

A voltage applied to Pockels cell 95 is controlled by control device 84. Control device 84 causes driver 96 to output a pulse voltage by controlling driver 96 in accordance with signal S2. Pockels cell 95 varies its direction of polarization as a pulse voltage output from driver 96 is applied thereto. Transmittance of Pockels cell 95 thus varies. By varying the transmittance of Pockels cell 95, the attenuation factor of attenuator 17 varies.

Attenuator 18 is similar in configuration to attenuator 17. Control device 84 causes driver 96 to output a pulse voltage by controlling driver 96 in accordance with signal S1. Transmittance of Pockels cell 95 thus varies. Namely, the attenuation factor of attenuator 18 varies.

By varying the transmittance of Pockels cell 95, the attenuation factor of attenuator 17 (and attenuator 18) is controllable. Therefore, intensity of light (indicated with light beam L in the drawing) that has passed through attenuators 17 and 18 is adjustable.

In the second embodiment, control device 84 varies the attenuation factor of light attenuator 18 in accordance with signal S1 and varies the attenuation factor of light attenuator 17 in accordance with signal S2. As described above, intensity of signal S1 indicates intensity of light output from multi-pass amplifier 11. By varying the attenuation factor of light attenuator 18, intensity of a first light pulse is adjusted. Such feedback control that an average value within a prescribed period of time of intensity of light output from multi-pass amplifier 11 is stabilized by varying the attenuation factor of light attenuator 18 in accordance with signal S1 can be realized. Similarly, such feedback control that an average value within a prescribed period of time of intensity of light output from multi-pass amplifier 12 is stabilized by varying the attenuation factor of light attenuator 17 in accordance with signal S2 can be realized.

For example, control device 84 causes increase in intensity of light output from light attenuator 18 by decreasing the attenuation factor of light attenuator 18 when intensity of light reception by light-receiving element 81 lowers. Control device 84 causes decrease in intensity of light output from light attenuator 18 by increasing the attenuation factor of light attenuator 18 when intensity of light reception by light-receiving element 81 increases. Since control of light attenuator 17 by control device 84 is similar to control of light attenuator 18 by control device 84, further description will not be repeated.

According to the second embodiment, an effect in the first embodiment can be obtained. In addition, according to the second embodiment, intensity of light output from the light pulse amplification system can be stabilized for a long period of time owing to feedback control above.

It is noted that the configuration for measuring intensity of light output from each of multi-pass amplifiers 11 and 12 is not limited to the configuration shown in FIG. 8 and other configurations may be adopted.

Third Embodiment

Figure 11:
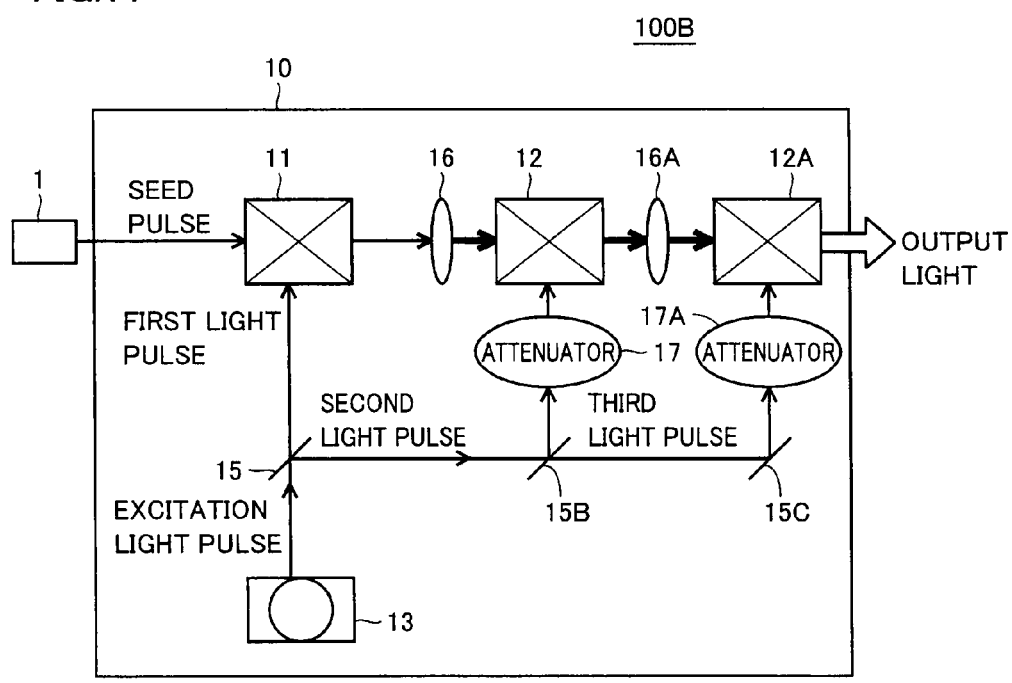
FIG. 11 is a schematic configuration diagram of a light pulse amplification system 100B including a light amplifier according to a third embodiment.

FIG. 11 is a schematic configuration diagram of a light pulse amplification system 100B including a light amplifier according to a third embodiment. Referring to FIGS. 11 and 1, light pulse amplification system 100B is different from light pulse amplification system 100 in further including a multi-pass amplifier 12A, a beam splitter 15B, a reflecting mirror 15C, a magnifying lens 16A, and an attenuator 17A. Since light pulse amplification system 100B is otherwise configured similarly to corresponding portions of light pulse amplification system 100, further description will not be repeated.

Multi-pass amplifier 12A is similar in configuration to multi-pass amplifier 12 (see FIG. 4 or 8). Beam splitter 15B splits a second light pulse into two light pulses. One of the two light pulses is input to attenuator 17 and the other of the two light pulses serves as a third light pulse input to attenuator 17A. Namely, beam splitter 15B extracts the third light pulse from the second light pulse.

Intensity (energy) of the third light pulse is weakened as it passes through attenuator 17A. The third light pulse that has passed through attenuator 17A is input to multi-pass amplifier 12A and excites a light amplification medium contained in multi-pass amplifier 12A.

It is noted that the third light pulse may directly be input to attenuator 17A. In this case, reflecting mirror 15C is not necessary.

According to the third embodiment, multi-pass amplifier 12A configured similarly to multi-pass amplifier 12 is provided in a stage subsequent to multi-pass amplifier 12. Multi-pass amplifier 12A amplifies a light pulse output from multi-pass amplifier 12. Therefore, intensity of light output from light amplifier 10 can further be increased. In addition, as attenuator 17A attenuates the third light pulse, a ratio of energy of the third light pulse to energy of the first light pulse (and a ratio of energy of the third light pulse to energy of the second light pulse) can be maintained at a prescribed ratio. It is noted that attenuator 17A can preferably adjust (attenuate) energy of the input light pulse continuously.

Energy of the third light pulse fluctuates in accordance with fluctuation in energy of the excitation light pulse from excitation light source 13. In addition, a light attenuation portion provided in an optical path through which a laser light pulse passes, for attenuating energy of the laser light pulse incident on the light attenuation portion itself, is provided in multi-pass amplifier 12A (see FIG. 4 or 8). Therefore, according to the third embodiment, as in the first embodiment, energy of the light pulse output from light amplifier 10 can be stabilized.

In the configuration shown in FIGS. 4 and 8, at least concave mirrors 8A, 8B and 8C and reflecting mirrors 31 to 39 implement the "first optical system" in the present invention. In addition, at least reflecting mirrors 61 to 68 implement the "second optical system" in the present invention. Quartz plates 71 to 74 implement the "light attenuation portion" in the present invention. Attenuators 17 and 18 implement the "intensity adjustment portion" in the present invention.

Moreover, the "light attenuation portion" in the present invention is not limited to the quartz plate so long as it attenuates energy of a light pulse that travels through optical path P2. For example, the "light attenuation portion" may be implemented by an ND (Neutral Density) filter.

Further, the number of multi-pass amplifiers included in the light pulse amplification system according to the present embodiment is not limited to two or three, and the number thereof may be set to four or more. Namely, the light pulse amplification system according to the present embodiment should only include at least two multi-pass amplifiers.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention can be utilized in a laser beam generation apparatus for generating laser light pulses.

The invention claimed is:
1. A light amplifier, comprising:
a first amplifier including a first light amplification medium excited by a first light pulse, for amplifying an input laser light pulse in an excited state, and a first optical system for forming a first optical path for said laser light pulse to pass through said first light amplification medium a plurality of times;

a second amplifier including a second light amplification medium excited by a second light pulse, for amplifying, when it receives amplified light which is said laser light pulse amplified by said first amplifier, said amplified light in an excited state, a second optical system for forming a second optical path for said amplified light to pass through said second light amplification medium a plurality of times, and at least one light attenuation portion provided in said second optical path, for attenuating energy of said amplified light incident on the light attenuation portion itself;

an excitation light source for generating an excitation light pulse for exciting said first and second light amplification media; and a first pulse splitting portion for splitting said excitation light pulse from said excitation light source into said first and second light pulses, and said second optical system being configured such that said amplified light alternately passes through said second light amplification medium and said at least one light attenuation portion and passes through said second amplification medium at least twice.

2. The light amplifier according to claim 1, wherein the number of times of passage of said laser light pulse traveling along said first optical path through said first light amplification medium is equal to the number of times of passage of said amplified light traveling along said second optical path through said second light amplification medium.

3. The light amplifier according to claim 1, further comprising an intensity adjustment portion for adjusting intensity of at least one pulse of said first and second light pulses such that a ratio between energy of said first light pulse input to said first light amplification medium and energy of said second light pulse input to said second light amplification medium attains to a prescribed value.

4. The light amplifier according to claim 3, wherein the number of times of passage of said laser light pulse traveling along said first optical path through said first light amplification medium is equal to the number of times of passage of said amplified light traveling along said second optical path through said second light amplification medium.

5. The light amplifier according to claim 4, wherein said intensity adjustment portion adjusts intensity of said at least one pulse such that an average value within a prescribed period of time of intensity of said amplified light output from said first amplifier and an average value within said prescribed period of time of intensity of output light output from said second amplifier arc constant.

6. The light amplifier according to claim 1, further comprising:

a second pulse splitting portion for extracting a third light pulse from said second light pulse; and a third amplifier identical in configuration to said second amplifier, for amplifying output light from said second amplifier as it receives said third light pulse and the output light.

* * * * *